United States Patent
Sims et al.

(10) Patent No.: US 7,590,945 B2
(45) Date of Patent: Sep. 15, 2009

(54) VIEWING APPLICATIONS FROM INACTIVE SESSIONS

(75) Inventors: Lisa K. Sims, McDonough, GA (US); Damon Lockwood, Decatur, GA (US); Michael Levy, Dix Hills, NY (US); Richard Omanson, Naperville, IL (US); Robert Schumacher, Wheaton, IL (US); Michael Murphy, Bethlehem, PA (US); Frank Germano, Westford, MA (US); Jill Wene Cheeks, Ashville, NC (US)

(73) Assignee: AT&T Intellectual Property I, L.P., Reno, NV (US)

( * ) Notice: Subject to any disclaimer, the term of this patent is extended or adjusted under 35 U.S.C. 154(b) by 537 days.

(21) Appl. No.: 11/026,679

(22) Filed: Dec. 31, 2004

(65) Prior Publication Data
US 2005/0278444 A1 Dec. 15, 2005

Related U.S. Application Data

(60) Provisional application No. 60/579,343, filed on Jun. 14, 2004.

(51) Int. Cl.
G06F 3/048 (2006.01)
G06F 3/00 (2006.01)

(52) U.S. Cl. ............... 715/781; 715/779; 715/750; 713/189

(58) Field of Classification Search ........... 715/842, 715/779, 808, 771, 750, 781, 738, 744; 705/26; 713/189; 709/224
See application file for complete search history.

(56) References Cited

U.S. PATENT DOCUMENTS

| | | | |
|---|---|---|---|
| 5,678,034 A * | 10/1997 | Chew | 345/520 |
| 5,757,371 A * | 5/1998 | Oran et al. | 715/779 |
| 5,838,317 A | 11/1998 | Bolnick et al. | |
| 5,870,552 A | 2/1999 | Dozier et al. | |
| 5,920,316 A | 7/1999 | Oran et al. | |
| 5,999,176 A | 12/1999 | Kamper | |
| 6,023,272 A | 2/2000 | Malamud et al. | |

(Continued)

OTHER PUBLICATIONS http://web.archive.org/web/20040306185255/www.corizon.com/benefits.html benefits: overview Mar. 6, 2004 (printed Dec. 23, 2006); 1 page.

(Continued)

Primary Examiner—Gilberto Barron, Jr.
Assistant Examiner—Hadi Armouche
(74) Attorney, Agent, or Firm—Thomas, Kayden, Horstemeyer & Risley, LLP (57) ABSTRACT

Embodiments of the present disclosure provide systems and methods for managing user-sessions. Briefly described, in architecture, one embodiment of the system, among others, includes logic configured to display a user interface for initiating a command to launch a business application on a computer display of a user; logic configured to associate a launched business application with a user-session; logic configured to display business applications of an active session on the computer display; a first user interface control for allowing a user to select a particular business application of an inactive session; and logic configured to display the selected particular business application on the computer display with the business applications associated with the active session. Other systems and method are also provided.

19 Claims, 7 Drawing Sheets

U.S. PATENT DOCUMENTS

| | | | |
|---|---|---|---|
| 6,215,490 B1* | 4/2001 | Kaply | 715/788 |
| 6,275,230 B1* | 8/2001 | Ingrassia et al. | 715/700 |
| 6,456,307 B1 | 9/2002 | Bates | |
| 6,473,505 B1 | 10/2002 | Khuc et al. | |
| 6,519,571 B1 | 2/2003 | Guheen | |
| 6,611,498 B1* | 8/2003 | Baker et al. | 370/252 |
| 6,643,661 B2* | 11/2003 | Polizzi et al. | 707/100 |
| 6,662,226 B1 | 12/2003 | Wang | |
| 6,738,817 B1 | 5/2004 | Chen | |
| 6,941,371 B2 | 9/2005 | Hartmann | |
| 6,983,155 B1 | 1/2006 | Cook | |
| 7,100,195 B1 | 8/2006 | Underwood | |
| 7,225,244 B2 | 5/2007 | Reynolds et al. | |
| 7,228,244 B2 | 6/2007 | Xin | |
| 7,263,655 B1 | 8/2007 | Carden, Jr. | |
| 2001/0029534 A1 | 10/2001 | Spinks et al. | |
| 2001/0047417 A1 | 11/2001 | Hartmann | |
| 2002/0111824 A1 | 8/2002 | Grainger | |
| 2003/0009752 A1 | 1/2003 | Gupta | |
| 2003/0048286 A1 | 3/2003 | Lal | |
| 2003/0071849 A1 | 4/2003 | Ferri | |
| 2003/0088640 A1 | 5/2003 | Rasheed et al. | |
| 2003/0189597 A1* | 10/2003 | Anderson et al. | 345/778 |
| 2004/0010574 A1 | 1/2004 | Cammick | |
| 2004/0028212 A1 | 2/2004 | Lok et al. | |
| 2004/0103409 A1 | 5/2004 | Hayner | |
| 2004/0117376 A1 | 6/2004 | Lavin | |
| 2004/0191744 A1 | 9/2004 | Guirguis | |
| 2004/0203750 A1 | 10/2004 | Cowdrey et al. | |
| 2004/0261037 A1* | 12/2004 | Ording et al. | 715/788 |
| 2005/0044197 A1 | 2/2005 | Lai | |
| 2005/0063530 A1 | 3/2005 | Cook et al. | |
| 2005/0066037 A1* | 3/2005 | Song et al. | 709/227 |
| 2005/0114792 A1 | 5/2005 | Gest | |
| 2005/0144150 A1 | 6/2005 | Ramamurthy et al. | |
| 2005/0153706 A1 | 7/2005 | Niemenmaa et al. | |
| 2005/0172235 A1 | 8/2005 | Cragun et al. | |
| 2007/0219842 A1 | 9/2007 | Bansal et al. | |

OTHER PUBLICATIONS http://web.archive.org/web/20040310140931/www.corizon.com/enterprise_features.html platform enterprise edition features: 1-3 Mar. 10, 2004 (printed Dec. 23, 2006); 3 pages.

http://web.archive.org/web/20040216191845/www.corizon.com/solutions.html Corizon Solution Feb. 16, 2004 (printed Dec. 23, 2006); 1 page.

http://web.archive.org/web/20040504231018/www.corizon.com/platform_overview.html Corizon Platform Overview May 4, 2004 (printed Dec. 23, 2006); 1 page.

http://web.archive.org/web/20040313213357/www.corizon.com/it_benefits.html Benefits for IT organisations Mar. 13, 2004 (printed Dec. 23, 2006); 1 page.

http://web.archive.org/web/20040407091225/www.corizon.com/user_benefits.html benefits for users Apr. 7, 2004 (printed Dec. 23, 2006); 1 page.

http://web.archive.org/web/20040603045823/www.netmanage.com/products/rumba/rumbaOffice.asp Rumba Office and ViewNow Jun. 3, 2004 (printed Dec. 23, 2006); 2 pages.

http://web.archive.org/web/20040603045823/http://www.netmanage.com/products/pdf/datasheets/52078-RUMBA-ENT-DS-04-04.pdf Windows-Based and Browser-Based Multi-Host Access for Evolving Enterprises Jun. 3, 2004 (printed Dec. 23, 2006); 2 pages.

http://web.archive.org/web/20040126023051/www.netmanage.com/hap/hap_access.asp Access Services Jan. 26, 2004 (printed Dec. 23, 2006); 1 page.

http://web.archive.org/web/20040404202850/www.netmanage.com/hap/hap_integration.asp Integration Services Apr. 4, 2004 (printed Dec. 23, 2006); 2 pages.

http://web.archive.org/web/20040603045044/www.netmanage.com/products/rumba/index.asp Powerful Host Access for the Evolving Enterprise Jun. 3, 2004 (printed Dec. 23, 2006); 2 pages.

http://web.archive.org/web/20040603082621/www.netmanage.com/products/rumba/rumbaw2h.asp Powerful, Secure, Easy-To-Deploy Host Access Jun. 3, 2004 (printed Dec. 23, 2006); 2 pages.

http://web.archive.org/web/20040402102021/www.netmanage.com/hap/hap_presentation.asp Presentation Sevices Apr. 2, 2004 (printed Dec. 23, 2006); 2 pages.

http://web.archive.org/web/20040125114121/http://toolbar.google.com/ Google Toolbar Jan. 25, 2004 (printed Dec. 23, 2006); 1 page.

http://web.archive.org/web/20040204014210/toolbar.google.com/menu_help.html Google Toolbar Feb. 4, 2004 (printed Dec. 23, 2006); 3 pages.

http://web.archive.org/web/20040217111141/toolbar.google.com/options_help.html Google Toolbar Options Feb. 17, 2004 (printed Dec. 23, 2006); 4 pages.

http://web.archive.org/web/20031206080131/toolbar.google.com/button_help.html Google Toolbar Features Dec. 6, 2003 (printed Dec. 23, 2006); 6 pages.

http://www.smartcomputing.com/editorial/article.asp?article=articles/archive/office97/09704/09704.asp&guid= Take a Shortcut to Office 87 Sep. 1998, vol. 2, Issue 3 of Smart Computing (printed Dec. 23, 2006); 7 pages.

http://www.codeproject.com/CSHARP/CSDOESSHELL3.ASP C# does Shell, Part 3 Mar. 3, 2003 (printed Dec. 23, 2006); 19 pages.

http://www.siebel.com/products/service/call_center/support_for_multiple_c.shtm May 25, 2004; 2 pages.

Microsoft Contact Center Framework White Paper Dec. 2003; 17 pages.

Microsoft Contact Center Framework A Guide to Business Benefits Dec. 2003; 13 pages.

Sims; U.S. Appl. No. 11/026,693, filed Dec. 31, 2004.
Omanson; U.S. Appl. No. 11/026,689, filed Dec. 31, 2004.
Sims; U.S. Appl. No. 11/027,325, filed Dec. 31, 2004.
Sims; U.S. Appl. No. 11/027,324, filed Dec. 31, 2004.
Chand; U.S. Appl. No. 11/026,677, filed Dec. 31, 2004.
McGlennon; U.S. Appl. No. 11/026,695, filed Dec. 31, 2004.
Bracey; U.S. Appl. No. 11/026,788, filed Dec. 31, 2004.
Sims; Non-Final Rejection mailed Jul. 27, 2007; U.S. Appl. No. 11/026,693, filed Dec. 31, 2004.
Sims; Examiner Interview Summary Record mailed Oct. 23, 2007; U.S. Appl. No. 11/026,693, filed Dec. 31, 2004.
Omanson; Non- Final Rejection mailed Oct. 9, 2007; U.S. Appl. No. 11/026,689, filed Dec. 31, 2004.
Omanson; Examiner Interview Summary Record mailed Jan. 7, 2008; U.S. Appl. No. 11/026,689, filed Dec. 31, 2004.
Sims; Non- Final Rejection mailed Aug. 22, 2007; U.S. Appl. No. 11/027,325, filed Dec. 31, 2004.
Sims; Non- Final Rejection mailed Jul. 27, 2007; U.S. Appl. No. 11/027,324, filed Dec. 31, 2004.
Sims; Examiner Interview Summary Record mailed Oct. 23, 2007; U.S. Appl. No. 11/027,324, filed Dec. 31, 2004.
Sims; Final Rejection mailed Jan. 7, 2008; U.S. Appl. No. 11/027,324, filed Dec. 31, 2004.
Chand; Non- Final Rejection mailed Oct. 9, 2007; U.S. Appl. No. 11/026,677, filed Dec. 31, 2004.
McGlennon; Non- Final Rejection mailed Aug. 9, 2007; U.S. Appl. No. 11/026,695, filed Dec. 31, 2004.
McGlennon; Final Rejection mailed Jan. 17, 2008; U.S. Appl. No. 11/026,695, filed Dec. 31, 2004.
Sims; Final Rejection mailed Jan. 16, 2008; U.S. Appl. No. 11/026,693, filed Dec. 31, 2004.
Website: http://web.archive.org/web/20040306185255/www.corizon.com/benefits.html; benefits: overview; Mar. 6, 2004 (printed Dec. 23, 2006); 1 page.
McGlennon; Examiner Interview Summary mailed Aug. 14, 2008 for U.S. Appl. No. 11/026,695, filed Dec. 31, 2004.
McGlennon; Non-Final Rejection mailed Jun. 13, 2008 for U.S. Appl. No. 11/026,695, filed Dec. 31, 2004.
Omanson; Non-Final Rejection mailed Oct. 9, 2007 for U.S. Appl. No. 11/026,689, filed Dec. 31, 2004.

Sims; Examiner Interview Summary mailed Aug. 14, 2008 for U.S. Appl. No. 11/027,325, filed Dec. 31, 2004.

Sims; Non-Final Rejection mailed Jun. 9, 2008 for U.S. Appl. No. 11/027,325, filed Dec. 31, 2004.

Sims; Examiner Interview Summary mailed Aug. 13, 2008 for U.S. Appl. No. 11/027,324, filed Dec. 31, 2004.

Sims; Non-Final Rejection mailed Jun. 9, 2008 for U.S. Appl. No. 11/027,324, filed Dec. 31, 2004.

Sims; Examiner Interview Summary mailed Aug. 13, 2008 for U.S. Appl. No. 11/026,693, filed Dec. 31, 2004.

Sims; Interview Summary mailed Oct. 23, 2007 for U.S. Appl. No. 11/026,693, filed Dec. 31, 2004.

Sims; Non-Final Rejection mailed Jun. 11, 2008 for U.S. Appl. No. 11/026,693, filed Dec. 31, 2004.

Bracey; Non-Final Rejection mailed Sep. 26, 2008 for U.S. Appl. No. 11/026,788, filed Dec. 31, 2004.

Chand; Final Office Action mailed Apr. 16, 2008 for U.S. Appl. No. 11/026,677, filed Dec. 31, 2004.

Chand; Non-Final Rejection mailed Sep. 26, 2008 for U.S. Appl. No. 11/026,677, filed Dec. 31, 2004.

Omanson; Non-Final Rejection mailed Sep. 30, 2008 for U.S. Appl. No. 11/026,689, filed Dec. 31, 2004.

Sims; Final Rejection mailed Nov. 20, 2008 for U.S. Appl. No. 11/027,324, filed Dec. 31, 2004.

Windows Version 5.1, copyright 2001, screenshots 1-7.

Chand, Examiner Interview Summary mailed Dec. 4, 2008 for U.S. Appl. No. 11/026,677, filed Dec. 31, 2004.

Omanson, Non-Final Rejection mailed Oct. 9, 2007 for U.S. Appl. No. 11/026,689, filed Dec. 31, 2004.

Omanson; Examiner Interview Summary mailed Dec. 24, 2008 for U.S. Appl. No. 11/026,689, filed Dec. 31, 2004.

Sims; Final Rejection, mailed Jan. 8, 2008 for U.S. Appl. No. 11/027,324, filed Dec. 31, 2004.

Bracey; Non-Final Rejection mailed Mar. 17, 2009 for U.S. Appl. No. 11/026,788, filed Dec. 31, 2004.

Windows Version 5.1, copyright 2001, screenshots 1-7.

Sims; Final Rejection mailed Dec. 3, 2008 for U.S. Appl. No. 11/027,325, filed Dec. 31, 2004.

Sims; Notice of Allowance and Fees Due mailed Dec. 11, 2008 for U.S. Appl. No. 11/026,693, filed Dec. 31, 2004.

McGlennon; Final Rejection mailed Dec. 3, 2008 for U.S. Appl. No. 11/026,695, filed Dec. 31, 2004.

Mcglennon; Notice of Allowance mailed May 13, 2009 for U.S. Appl. No. 11/026,695 filed Dec. 31, 2004.

Sims; Non-Final Rejection mailed May 07, 2009 for U.S. Appl. 11/027,325 filed Dec. 31, 2004.

Sims; Non-Final Rejection mailed Apr. 27, 2009 for U.S. Appl. 11/027,324 filed Dec. 31, 2004.

Chand; Supplemental Notice of Allowance mailed May 1, 2009 for U.S. Appl. No. 11/026,677 filed Dec. 31, 2004.

* cited by examiner

VIEWING APPLICATIONS FROM INACTIVE SESSIONS

CROSS-REFERENCE TO RELATED APPLICATION

This application claims priority to U.S. provisional application entitled, "Presentation System," having Ser. No. 60/579,343, filed Jun. 14, 2004, which is entirely incorporated herein by reference.

This application is related to U.S. utility patent application entitled "Frameless Presentation System" filed on the same date as the present application and accorded Ser. No. 11/026,695, which is entirely incorporated herein by reference; U.S. utility patent application entitled "Navigational Controls for a Presentation System" filed on the same date as the present application and accorded Ser. No. 11/026,689, which is entirely incorporated herein by reference; U.S. utility patent application entitled "Multiple Application Viewing" filed on the same date as the present application and accorded Ser. No. 11/027,325, which is entirely incorporated herein by reference; U.S. utility patent application entitled "Organizing Session Application" filed on the same date as the present application and accorded Ser. No. 11/026,693, which is entirely incorporated herein by reference; U.S. utility patent application entitled "Floating User Interface" filed on the same date as the present application and accorded Ser. No. 11/027,324, which is entirely incorporated herein by reference; U.S. utility patent application entitled "Tracking User Operations" filed on the same date as the present application and accorded Ser. No. 11/026,788, which is entirely incorporated herein by reference; and U.S. utility patent application entitled "Administration Manager" filed on the same date as the present application and accorded Ser. No. 11/026,677, which is entirely incorporated herein by reference.

TECHNICAL FIELD

The present disclosure is generally related to computer systems and, more particularly, is related to presenting data from computer applications.

BACKGROUND

Many desktop presentation systems, such as those in use within call center environments, pose significant challenges in user productivity. For example, multiple user interface technologies, desktops, and metaphors are pervasive within today's call center environments, including for example, web browsers, X/Motif emulators, TN3270, and PC-based graphical user interfaces (GUIs). Accordingly, a user in an environment, such as a call center environment, often has to employ a variety of different applications on a computer desktop at the same time which can be difficult to manage, organize, and to effectively operate. For example, a user may have multiple applications or multiple instances of an application launched on the user's computer desktop. These launched applications or instances, however, may not be related in a common manner. For example, one group of applications may be for one customer or transaction and another group of applications is for another customer or transaction. However, in the midst of working on one customer or transaction, a user may also prefer to selectively work on a particular application or instance from another customer or transaction.

Thus, a heretofore unaddressed need exists in the industry to address the aforementioned deficiencies and inadequacies.

SUMMARY

Embodiments of the present disclosure provide systems and methods for managing user-sessions. Briefly described, in architecture, one embodiment of the system, among others, includes logic configured to display a user interface for initiating a command to launch a business application on a computer display of a user; logic configured to associate a launched business application with a user-session; logic configured to display business applications of an active session on the computer display; a first user interface control for allowing a user to select a particular business application of an inactive session; and logic configured to display the selected particular business application on the computer display with the business applications associated with the active session.

Embodiment of the present disclosure can also be viewed as providing methods for managing user-sessions. In this regard, one embodiment of such a method, among others, can be broadly summarized by the following steps: establishing a single user interface on a display of a computer that provides access to a plurality of business computer processes and manages user-sessions on the computer; establishing an active user session, the active user session having at least one computer application associated with the active user session; establishing an inactive user session, the inactive user session having at least one computer application associated with the inactive user session; displaying a respective representation for each of the computer applications of the active session on the display of the computer; selecting one of the at least one computer application of the inactive session; and displaying a representation of the one of the at least one computer application of the inactive session on the computer display with the respective representation for each of the computer applications of the active session.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
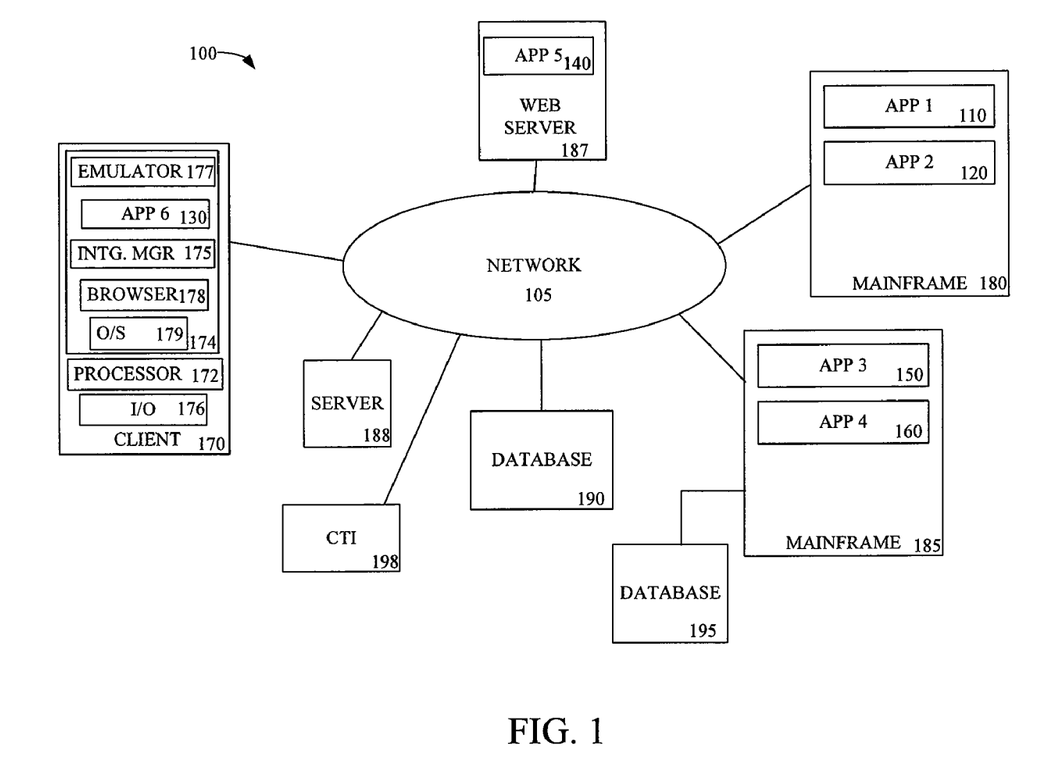
FIG. 1 is a block diagram showing one embodiment, among others, of a desktop-viewing system of the present disclosure.

FIG. 1 shows one embodiment of a desktop-viewing system 100 for enabling the viewing of multiple representations of computer applications within a single user-session of a common task-oriented environment, such as a call-center environment. The desktop-viewing system 100 in FIG. 1 comprises a general-purpose computer 170 connected to a computer network 105, such as the Internet, Intranet, local area network (LAN), wide area network (WAN), etc. Also connected to the computer network 105 are other computing devices, such as mainframe computers 180, 185, servers 187-188, and network databases 190, 195 that contain computer applications and data. A variety of computer applications 110, 120, 130, 140, 150, 160 may be installed on mainframe computers 180, 185. In addition, web-based applications 140 may be installed on the servers 187-188; and data accessed by these applications may be stored on the databases 190, 195. For some embodiments, a computer telephone integration system 198 is included to retrieve data from an interactive voice response system (not shown) and route the data to an appropriate user client as a screen pop that is pre-populated with information and may launch a new user-session.

Typically in a business enterprise, mainframe computers 180-185 execute a variety of line of business (LOB) applications which may include older computer systems that are critical to the operation of the enterprise and are generally referred to as legacy systems 110, 120, 150, 160. To access legacy systems or applications 110, 120, 150, 160 on a mainframe computer or host 180, 185, a terminal (e.g. IBM 3270) with little processing capacity was traditionally utilized, since most of the processing took place at the host or mainframe computer. The host transmitted formatted screens of character-based data to the terminal that were displayed on the terminal screen. Unlike general-purpose computers of today, a user cannot jump from program to program in a legacy system or use the operating system to transfer data from one program to another. Each screen had to be individually requested from the host, and therefore, it might take several seconds to transition from screen to screen. In addition, a user may need to log out of a session of one legacy application 110 so that the user could access a screen of another legacy application 120, 150, 160. Such terminals are outdated today, since these systems often run on obsolete hardware and software and may no longer be maintainable or expandable.

Because the logic required to run legacy systems reflects a significant investment, owners of legacy systems are understandably reluctant to discard them. One possible answer is to install a software terminal emulator 177 in the general-purpose computer 170 which enables it to operate as though it were a character-based terminal. With the emulator installed, the general-purpose computer 170 looks like a standard terminal to the host 180, 185.

As shown, the general-purpose computer 170 includes a variety of applications 130, 175, 178 also loaded into memory of the general-purpose computer 170. Generally, in terms of hardware architecture, as shown in FIG. 1, the computer 170 includes a processor 172, memory 174, and one or more input and/or output (I/O) devices 176 (or peripherals) that are communicatively coupled via a local interface (not shown). The local interface can be, for example but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 172 is a hardware device for executing software, particularly that stored in memory 174. The processor 172 can be any custom made or commercially available processor, a central processing unit (CPU), an auxiliary processor among several processors associated with the computer 170, a semiconductor based microprocessor (in the form of a microchip or chip set), a macroprocessor, or generally any device for executing software instructions. Examples of suitable commercially available microprocessors are as follows a PA-RISC series microprocessor from Hewlett-Packard Company®, an 80x86 or Pentium® series microprocessor from Intel Corporation®, a PowerPC® microprocessor from IBM®, a Sparc® microprocessor from Sun Microsystems, Inc®, or a 68xxx series microprocessor from Motorola Corporation®.

The memory 174 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 174 may incorporate electronic, magnetic, optical, and/or other types of storage media. Note that the memory 174 can have a distributed architecture, where various components are situated remote from one another, but can be accessed by the processor 172.

The software in memory 174 may include one or more separate programs, each of which comprises an ordered listing of executable instructions for implementing logical functions. In the example of FIG. 1, the software in the memory 174 includes an integration manager 175 in accordance with the present disclosure; a suitable operating system (O/S) 179; terminal emulator 177; and a web browser application 178. A nonexhaustive list of examples of suitable commercially available operating systems 179 is as follows: (a) a Windows® operating system available from Microsoft Corporation®; (b) a Netware® operating system available from Novell, Inc.®; (c) a Macintosh® operating system available from Apple Computer, Inc®; (d) a UNIX® operating system, which is available for purchase from many vendors, such as the Hewlett-Packard Company®, Sun Microsystems, Inc.®, and AT&T Corporation®; (e) a LINUX® operating system, which is freeware that is readily available on the Internet; (f) a run time Vxworks® operating system from WindRiver Systems, Inc.®; or (g) an appliance-based operating system, such as that implemented in handheld computers or personal data assistants (PDAs) (e.g., PalmOS® available from Palm Computing, Inc.®, and Windows CE® available from Microsoft Corporation®). The operating system 179 controls the execution of other computer programs, such as the integration manager 175, and provides scheduling, input-output control, file and data management, memory management, and communication control and related services.

According to an exemplary embodiment, the integration manager 175 is a source program, executable program (object code), script, or any other entity comprising a set of instructions to be performed. When a source program, then the program needs to be translated via a compiler, assembler, interpreter, or the like, which may or may not be included within the memory 174, so as to operate properly in connection with the O/S 179. Furthermore, the integration manager 175 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 176 may include input devices, for example but not limited to, a keyboard, mouse, scanner, microphone, etc. Furthermore, the I/O devices 176 may also include output devices, for example but not limited to, a printer, display, etc. Finally, the I/O devices 176 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 170 is a PC, workstation, or the like, the software in the memory 174 may further include a basic input output system (BIOS) (omitted for simplicity). The BIOS is a set of software routines that initialize and test hardware at startup, start the O/S 179, and support the transfer of data among the hardware devices. The BIOS is stored in ROM so that the BIOS can be executed when the computer 170 is activated.

When the computer 170 is in operation, the processor 172 is configured to execute software stored within the memory 174, to communicate data to and from the memory 174, and to generally control operations of the computer 170 pursuant to the software. The integration manager 175, the O/S 179, and other local applications 130, 178, etc. in whole or in part, but typically the latter, are read by the processor 172, perhaps buffered within the processor 172, and then executed.

Referring back to FIG. 1, the integration manager 175 included in the general purpose computer 170 manages the displaying of multiple computer applications 110, 120, 130, 140, 150, 160, including legacy applications 110, 120, 150, 160 located on mainframe computers 180, 185. Typically, users (such as sales agents in a call-center environment) located in different geographical locations access LOB applications via their locally installed integration manager applications 175. The integration manager 175, in some embodiments, comprises a user interface that is represented in a visual form of an application bar (e.g., a toolbar) on a desktop of the general-purpose computer 170. Generally, an application bar is a Windows control that allows a user to perform some actions by clicking a button on the application bar. An application bar often simplifies a user's job by bringing the most accessible actions as buttons that can be directly accessed by the user.

Generally, the integration manager 175 manages the presentation of data on the desktop of the general-purpose computer 170 or another display from other computer applications. In one embodiment, the integration manager 175 provides a usable and efficient user interface to manage multiple applications and user sessions as well as to organize the user desktop and to promote efficient work processes. Integration manager 175, in some embodiments, includes Application Integration Framework (AIF) and computer telephony interaction (CTI) abstraction.

In one embodiment, among others, of the desktop-viewing system, integration manager 175 utilizes Microsoft® Contact Center framework version 1.0 which runs on Microsoft .Net® Framework version 1.1. Further, some embodiments of the integration manager is integrated with additional solution components such as Single Sign-On, Agent Profiling, and Event/Interaction logging. For example, some embodiments of the integration manager 175 maintain and manage an encrypted password store that is called when a user wants to log into a given application.

Figure 2:
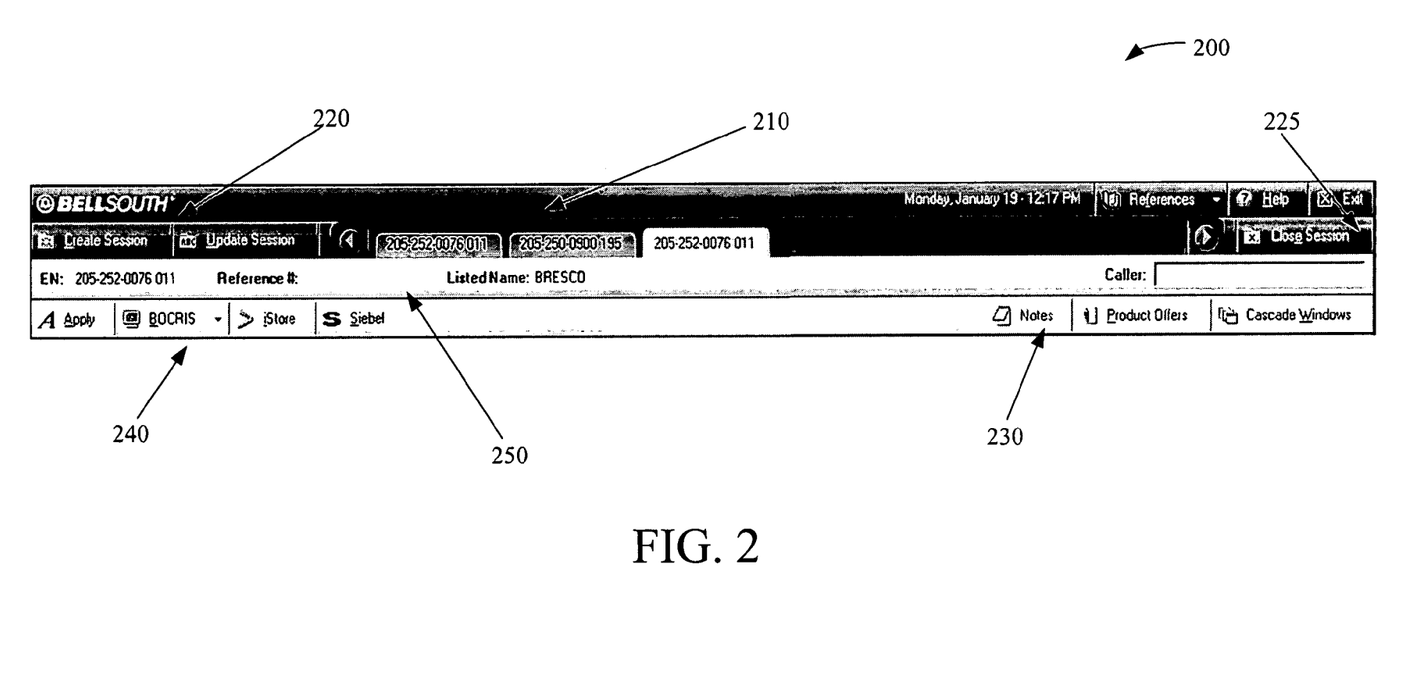
FIG. 2 is a diagram of one embodiment of a toolbar interface utilized in the desktop-viewing system of FIG. 1.

In one embodiment, among others, the integration manager 175 contains the following primary user interface elements: graphical toolbar interface, user-session navigator, and notepad application. The toolbar provides access to the core integration manager functionality including user-session opening/closing and launching applications. FIG. 2 contains an example toolbar 200 to illustrate the user interface (UI) elements.

The session display 210 indicates the currently active sessions where a session may be generally referred to as a group of applications that are associated with a common subject or task. The session display 210 could take the form of a tab bar, drop down list, or any control that allows the user to choose a session. When the user chooses a session from the session display 210, the currently active session's applications are hidden, and the new session's applications are displayed. The session management buttons 220 control the opening and closing of sessions. When the user clicks the 'Create Session' button 220, a new session is created, displayed, and updated. Conversely, if the user clicks the 'Close Session' button 225, the current session is closed, removed from the session display, and the next session in the list is made active.

Tool buttons 230 launch additional tools such as a user-session navigator interface or notepad application. When the user clicks on a tool button 230, the tool opens and receives focus. Application buttons 240 launch applications (e.g., local applications and remote applications stored on a mainframe computer) implemented by the integration manager 175. When the user clicks an application button 240, a new instance of the hosted application opens and receives focus. Utilizing a Single Sign-On solution, the hosted application then authenticates the user if necessary.

Figure 3:
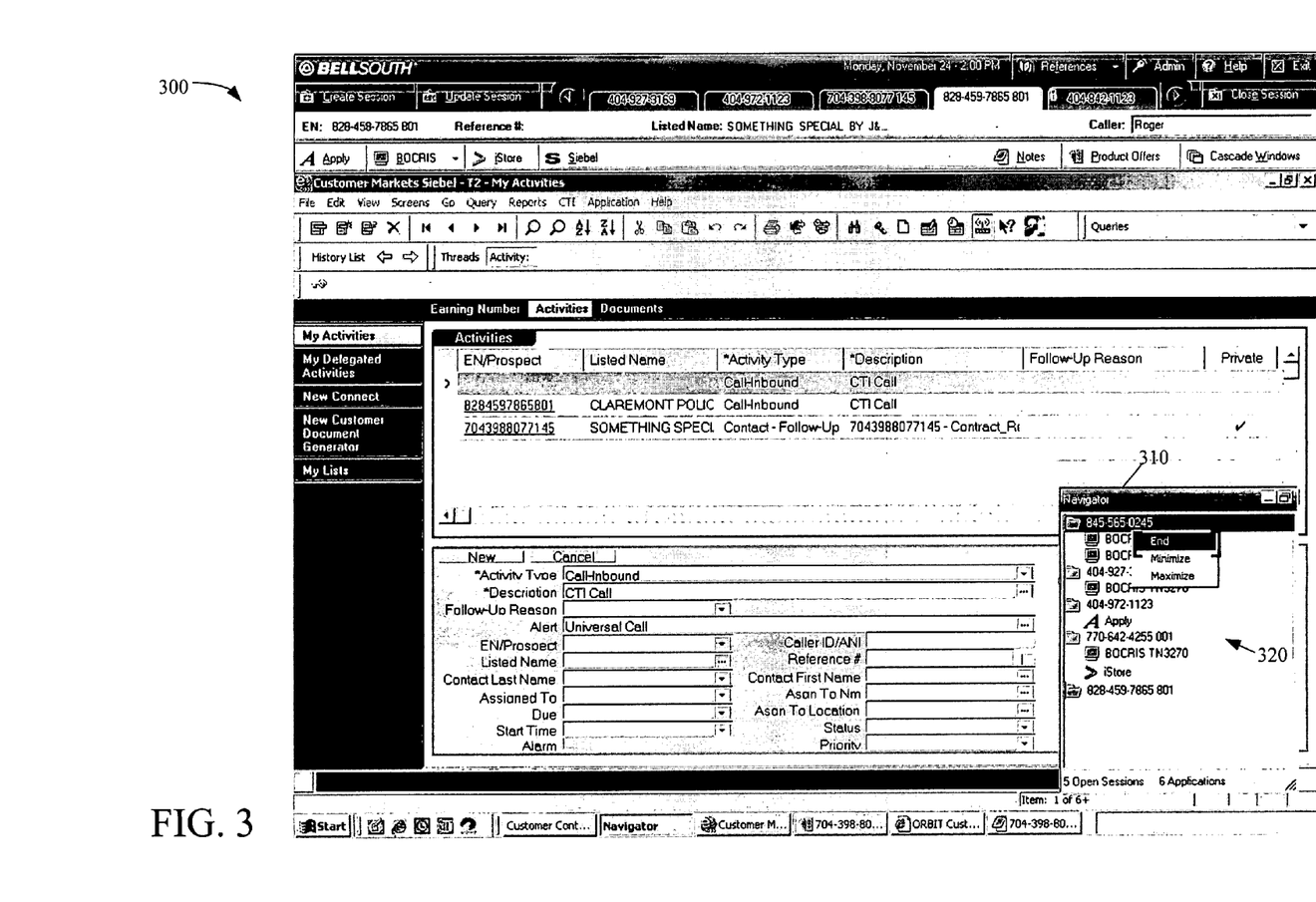
FIGS. 3-5 are screenshot diagram of various embodiments, among others, of desktop arrangements of the desktop-viewing system of FIG. 1.

The session information display 250 displays information about the current session such as phone number, customer name, etc. and updates whenever the user changes the active session. In some embodiments, a user-session navigator interface 310, as depicted in a screenshot of one embodiment 300 of a desktop arrangement of the desktop-viewing system 100 in FIG. 3 provides a summary of the current open sessions in the desktop and allows the user to switch seamlessly between them. A session view control 320 displays all of the user's active sessions either in a tree control or in a 'collapsed' button view. When a user clicks on a session within the view, the current session's applications are hidden and the new session's applications displayed. If a user clicks on an individual application within the current session, the application is brought forward and receives focus. The session view 320 may also contain functionality to display an application instance not within the current session. For example, if the user clicks on an application not within the current session, the application is displayed in the current context and receives focus. In this way, the desktop-viewing system 100 allows a user to quickly see what applications are open within each session and allows the user to choose to pull an application from one session (e.g., an inactive session) into another session (e.g., an active session) through the use of the user-session navigator interface.

Generally, within a Windows environment, a session is identified by a session identifier, and the graphical window controls representing the applications that have been launched during the respective session are identified by respective Globally Unique Identifiers (GUIDs). Therefore, a first session may be uniquely identified and associated with a first GUID and a second GUID. Accordingly, a second session may be uniquely identified and associated with a third GUID. As previously stated, one feature of some embodiments includes the ability to display a window of the second session during another session, such as the first session. This concept is graphically depicted in a screenshot of a desktop arrangement of one embodiment 400 of the desktop-viewing system in FIG. 4. Here, the window 410 for a Business Office Customer Record Inquiry System (BOCRIS) application from an inactive session is being displayed along with windows 420, 430 from applications associated with an active session. In this way, a user can access applications from an active session and can also access applications from an inactive session at the same time. Therefore, the integration manager 175 allows a user to view an application instance from a previous or inactive session without deactivating the current session.

Figure 4:
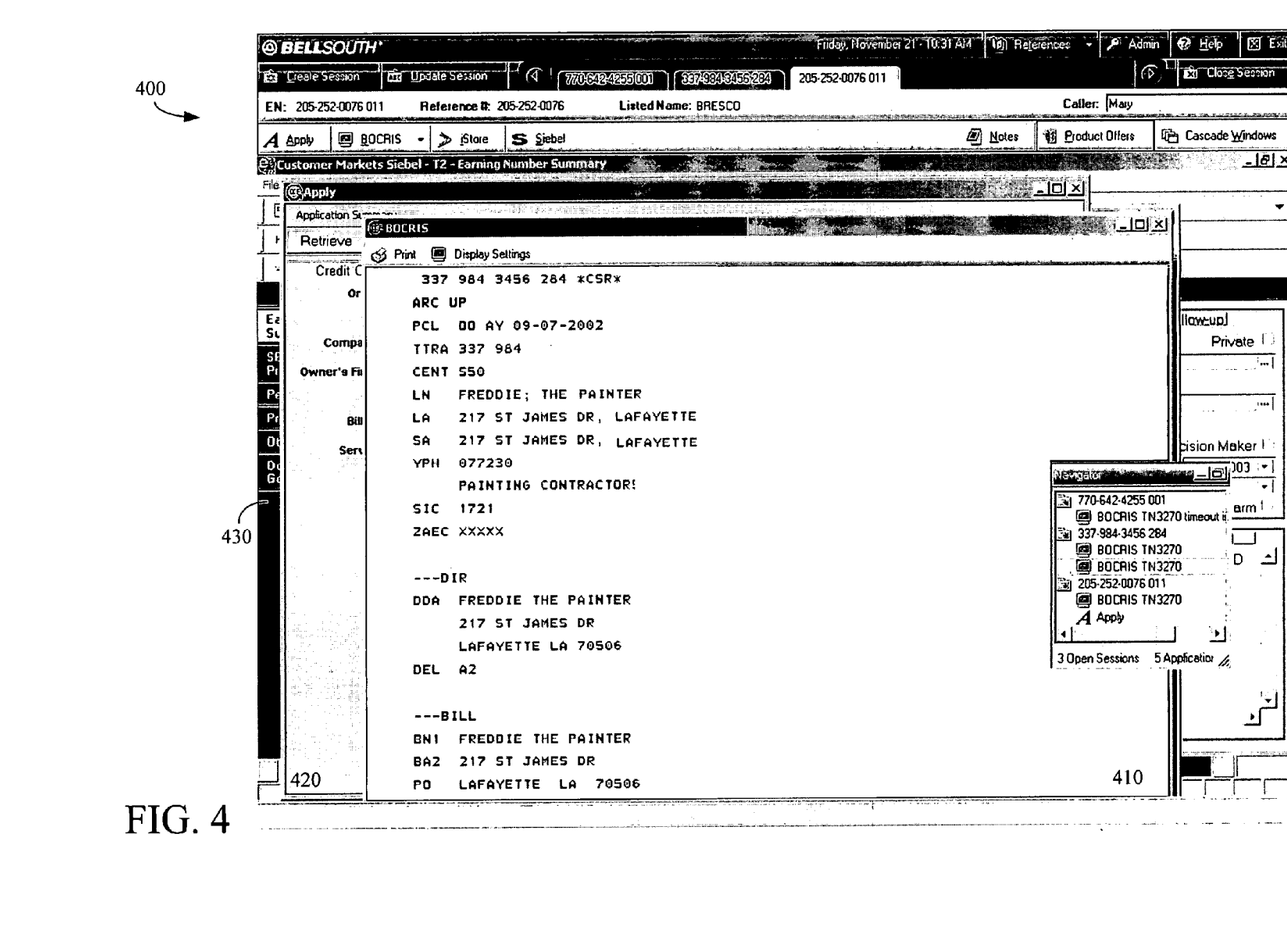

For some embodiments, to implement this type of usability, the GUID for the window associated 410 with the inactive session is registered to the active session (e.g., 205-252-0076 011) and a temporary identifier is established to maintain the link between the inactive session (e.g., 337-984-3456 284) and the GUID of the window 410 that has been re-registered to the active session (e.g., 205-252-0076 011). Therefore, after a stated event (such as a command to close the window or a command to switch to the previous inactive session), the GUID of the window 410 is registered again with the inactive session (e.g., 337-984-3456 284) identified by the temporary identifier.

Figure 5:
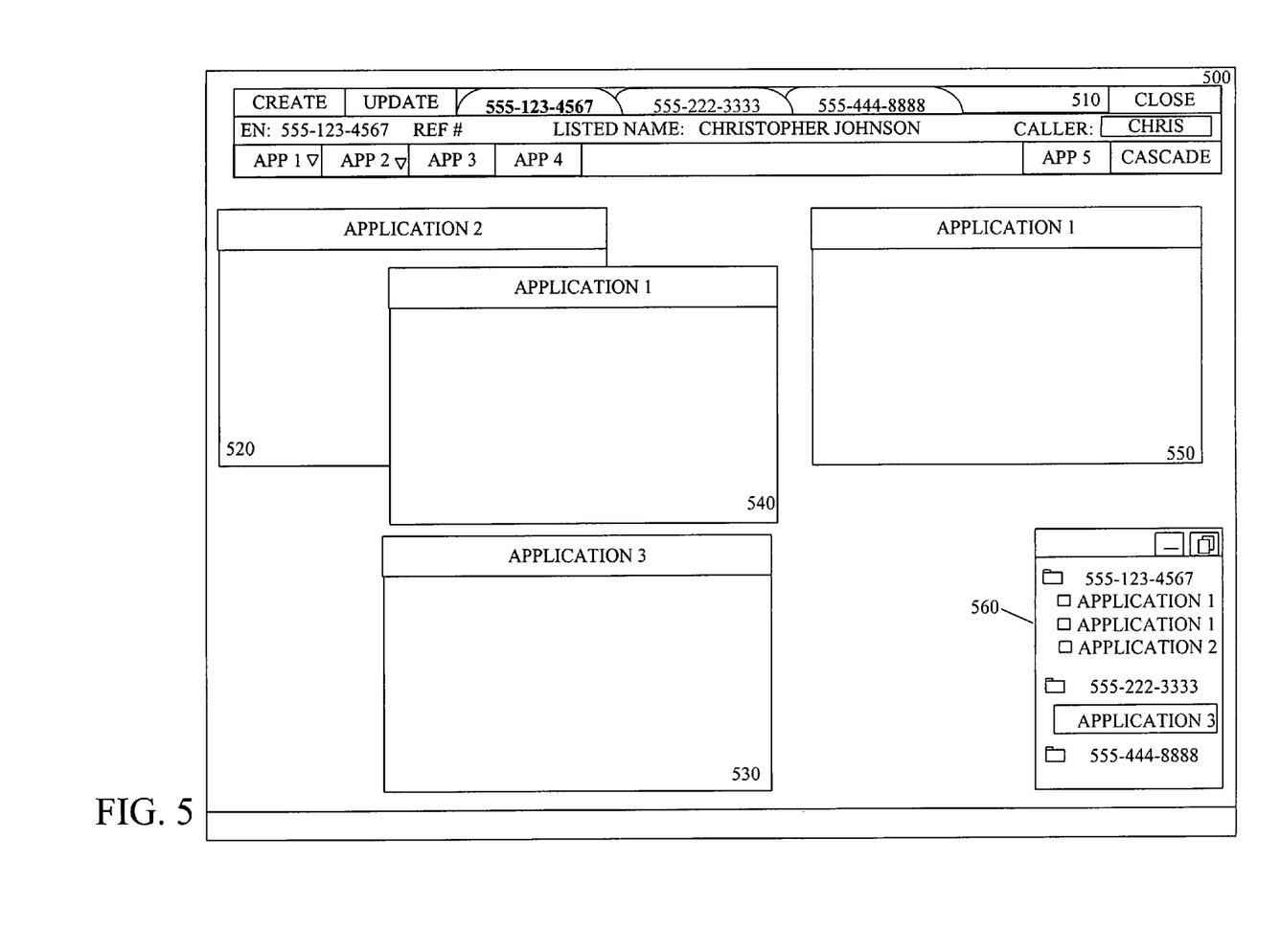

FIG. 5 shows another embodiment of a desktop arrangement of the desktop-viewing system 100. As shown in FIG. 5, a desktop 500 is presented with an application bar or toolbar interface 510. The toolbar interface 510 is a user interface to the desktop-viewing system 100. In the embodiment shown, a user has accessed Application 2, Application 3, and two renditions of Application 1, as shown by windows 520, 530, 540, 550. A user interface control 560 displays the user's active sessions and associated applications.

For hosted applications on a mainframe, the desktop-viewing system 100 displays data from a respective hosted application in a graphical window control that is a representation of the respective hosted application. The particular graphical window control is assigned a GUID that is associated with the application bar or toolbar interface 510 and not to the hosted application. The hosted application is typically not registered and executed as a separate application with the operating system 179 of a general-purpose computer of the user. For local applications (e.g., a fat client of LOB application), the local application may be registered and executed as a separate application apart from the toolbar interface 510 with the operating system 179 (as described hereinafter). However, both the local applications and the hosted applications appear in similar manners in relation to the toolbar 510 on the desktop 500. In this way, the desktop-viewing system 100 can leverage existing clients or existing vertical applications.

One embodiment of the integration manager application 175 is built-on Microsoft's .NET® Framework. Accordingly, one embodiment provides a hosted web application class with which to integrate web applications. The hosted web application class contains an ActiveX® version of Microsoft's Internet Explorer® web browser and implements the hosted application interface. ActiveX® web browser executes actions via a scripting language or by redirecting to a specific uniform resource locator (URL). To implement more advanced action functionality, an enhanced hosted web application class is created that allows the execution of successive actions defined by an XML-based macro language. The XML macro language supports the ability to perform successive requests, populate form fields, and execute conditional logic. Actions defined in the XML macro language can be modified without requiring recompilation, allowing for additional extensibility following deployment.

If the XML macro language is insufficient to execute all of the necessary functionality or cannot interface with a web application due to embedded objects such as applets or ActiveX® control, the web application can be wrapped within a .NET® Windows form containing the ActiveX® version of the Internet Explorer® web browser (or some other compatible web browser, for example) and specific code written in the form to interface with the application. Alternatively, if possible, the web application itself could be modified to process actions passed via web request.

In order for an application to be hosted by the integration manager 175, the application typically implements a hosted application interface. The application host interacts with a variety of classes including windows forms and web applications. Some embodiments of the integration manager 175 provides an external hosted application class to integrate with applications that enable scripting via JavaScript® or VBScript® but cannot actually be hosted within the integration manager user interface like a Windows control or a web application. Such applications include the Microsoft Office® suite products: Word®, Excel®, etc. The external hosted application implements the hosted application interface and executes actions utilizing the scripting language. If an application provides an ActiveX interface, the ActiveX® control is hosted within a .NET Windows® user control in order to integrate the application within the integration manager 175. The user control implements the hosted application interface to allow the application host to integrate with the application. The Windows Form executes actions by calling the API exposed by the ActiveX® control. Once the ActiveX® control is "wrapped" in the user control, the application is incorporated into the framework as previously described.

If an application provides a COM interface, the application is hosted by creating a .NET Windows® user control to integrate with the application via the COM interface. The user control allows the user interface to display information from the application. The user control implements the Hosted Application interface to allow the application host to integrate with the application. To execute actions, the user control calls methods exposed by the COM application. The user control is incorporated into the integration manager 175, as previously described.

In some embodiments, data access and data update is typically done via web services. The web services use .NET® Framework data to access a server 188 (e.g, SQL server) as the data source. If an application provides a web service interface, the application is hosted by creating a .NET Windows® user control to integrate with the application via the web service. Similar to the COM application, the user control provides the user interface to display information from the application. The user control implements the hosted application interface to allow the application host to integrate with the application. To execute actions, the user control calls web methods exposed by the web service. The user control is incorporated into the integration manager 175, as previously described.

At initialization, the integration manager 175 creates the application host object. The application host object requests application information from web services. The integration manager 175 utilizes this information to populate the application bar 200 and any other user interface elements (such as user-session navigator 310). Following initialization, the integration manager 175 sends commands to and receives events from the application host in order to manage sessions. For example, when the user clicks on the application bar, the integration manager 175 requests a new application instance from the application host. The application host creates a new instance and returns it to the integration manager 175. When the user asks for an action to be performed (task, focus, etc.), the integration manager 175 requests the action from application host. The application host finds the appropriate application by session and instance and requests the action. The hosted application then performs the action. The integration manager 175 can also share data between applications utilizing actions. When requesting an action, the integration manager 175 can provide the application host with an XML string containing any data specific to that action. When the hosted application executes the action, it can utilize the data appropriately. Such data sharing can prevent re-keying of information, such as customer name and telephone number, for example.

As previously mentioned, disparate technologies and applications may be interfaced using the integration manager 175 system as described in the present disclosure. A variety of the applications and their functions in a call center environment, for some embodiments, are as follows. A Siebel® Call Center application allows viewing customer-specific promotions; viewing and performing customer follow-ups; and locating customer records. BOCRIS allows viewing detailed billing information including screens directed toward local service itemization (LSI), billing, customer service reports (CSR), pending orders, etc. Also, an Apply web application (or similar application) for processing wireless telecommunication services is integrated into the .NET client of the integration manager 175, for some embodiments involving call-center environments, in order to view promotions and eligibility; placing orders; and checking customer credit information. In addition, an iStore web application (or similar application) for processing digital subscriber line (DSL) service orders is integrated into the .NET client of the integration manager 175. In particular, the iStore web application enables DSL Loop Qualification & Order Placement for a call-center environment. Single Sign-On support, for some embodiments, is implemented in for the iStore and Apply application classes. An Orbit web application (or similar application) is integrated into the .NET® client as a link from the toolbar interface 200 for some embodiments. The link launches the Orbit web application. Other embodiments also incorporate other applications such as PC-based applications.

In some embodiments, Siebel® 6.3 may not be integrated by the integration manager 175 as a typical hosted application. Because some Siebel® implementations are integrated with CTI 198, Siebel® preferably operates in a process outside of the integration manager framework. The integration manager 175 interacts with Siebel® independently of the Application Integration Framework. The integration manager 175 exposes itself as a COM interface that Siebel® calls to notify the integration manager 175 of events such as the CTI screen pop. In addition, the integration manager 175 calls the COM interface (that Siebel® exposes) to retrieve information about the current Siebel® record (telephone number, name, etc.) and the current Siebel® state (page, view, etc.).

For some embodiments, a RUMBA® 3270 Emulator, which hosts the Business Office Customer Record Inquiry System (BOCRIS), exposes an ActiveX® interface that can be integrated by the integration manager 175. A user control is created to host the ActiveX® control. The user control hosting the RUMBA® ActiveX® control implements the hosted application interface. The user control also implements actions that are called by the integration manager 175, such as logging in the user and navigating to a specific BOCRIS screen.

The integration manager 175 also allows for multiple views of a particular application to be displayed within a single user-session. For example, within a single session, a user can display two renditions of an application at the same time and right next to each other. Accordingly, some embodiments of the integration manager 175 allows multiple instances of a BOCRIS application to be opened during the same session, for example. For a sales agent, this is advantageous because it provides the agent the ability to see more than one application at a time. For example, complex applications that require multiple windows for interaction, such as a ROS (Regional Ordering System) application, are facilitated. As shown in FIG. 5, two renditions 540, 550 of Application 1 are shown for session 555-123-4567. The architectural limitations of particular applications may prevent a particular application from showing multiple renditions of the application at the same time. For these situations, simultaneous multiple views is not allowed. However, multiple renditions that are not shown simultaneously are still possible.

For example, a Siebel® Call Center application may not allow more than one process of the application to be run by a user at a time. Therefore, simultaneous viewing of two displays of different Siebel® processes is not allowed. However, the integration manager 175 can toggle between views of two different Siebel® processes that are not shown at the same time. For example, a user can toggle or flip between viewing a display from a Siebel® application for one session and a Siebel® application for another session. This is done by a rehydration technique whereby data for one session is saved and stored in a database as the user toggles to a different session and then re-input into the Siebel® application as the user toggles back to the session. Therefore, data associated with a session is input into the application when the user activates the session and the data is saved when the user exits the session. Technically, the integration manager 175 can access or jump to different places within an application utilizing this technique. Therefore, embodiments of the integration manager 175 allows for more than one representation of an application to be rendered across different sessions even when the architecture of an application prevents more than one instance of the application from being simultaneously opened.

Some applications, such as BOCRIS application, do allow a user to run more than one process at a time. Therefore, the integration manager 175 can have more than one process running at a time. Therefore, within one session, the integration manager 175 can have multiple renditions of a BOCRIS application being displayed. In another session that is not active, the desktop-viewing system 100 can also have another process of the BOCRIS application being run that is not currently being displayed to the desktop. To implement this, some embodiments utilize a command within the Windows operating environment that makes a particular window associated with an application (such as the toolbar interface 510) visible or non-visible. Based on an event which tells the toolbar interface 510 to SWITCH SESSIONS for example, the operating system 179 makes a particular window non-visible, and based on an event that tells the toolbar interface 510 to BRING BACK THE SESSION for example, the operating system makes the particular window visible.

As previously mentioned, the toolbar interface 510 contains a variety of buttons to help a user manage and control the presentation of windows displayed on the desktop 500. Although many of the embodiments discussed herein involved call-center environments, the present disclosure is not limited to call-center environments. Other lines of business activities such as those in banking, accounting, etc. are also contemplated.

Figure 6:
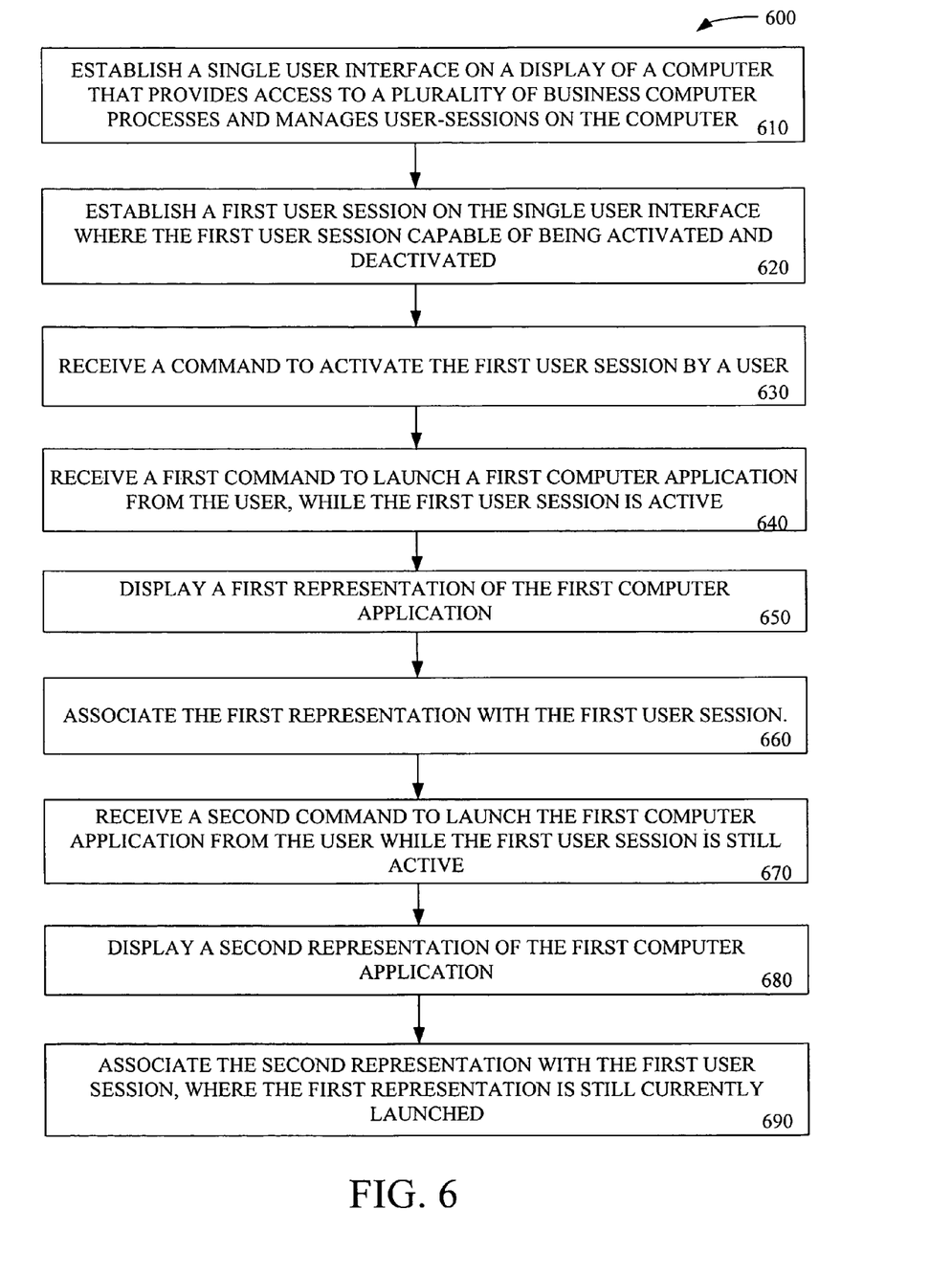
FIGS. 6-7 are flowcharts describing the functionality of various embodiments, among others, of the presentation system of FIG. 1.

Therefore, embodiments of the desktop-viewing system 100 manage the presentation of business processes or other related tasks. The flowchart of FIG. 6 shows the functionality of a representative implementation of the desktop-viewing system 100 of the present disclosure. As depicted in FIG. 6, the functionality of one embodiment of the desktop-viewing system 100 or method 600 may be construed as beginning at the step of establishing (610) a single user interface on a display of a computer that provides access to a plurality of business computer processes and manages user-sessions on the computer. Then, a first user session is established (620) on the single user interface, the first user session capable of being activated and deactivated. After receiving (630) a command to activate the first user session by a user (e.g., clicking on a session indicator on the session navigator interface), the first user session is activated. Then, a first command to launch a first computer application is received (640) from the user, while the first user session is active. In response to the received command; a first representation of the first computer application is displayed (650), and the first representation is associated (660) with the first user session. Next, a second command to launch the first computer application is received (670) from the user (e.g., clicking on a session indicator on the session navigator interface), while the first user session is still active. In response to the received second command, a second representation of the first computer application is displayed (680), and the second representation is associated (690) with the first user session, wherein the first representation is still currently launched. For some embodiments, the first representation and the second representation of the computer application are capable of being displayed adjacent to one another on the computer display. Further, in some embodiments, the single user interface is configured to launch a plurality of computer applications, the plurality of computer applications comprising a first business application stored on a mainframe computer; a second business application stored locally; and a third computer application stored on a web server.

Figure 7:
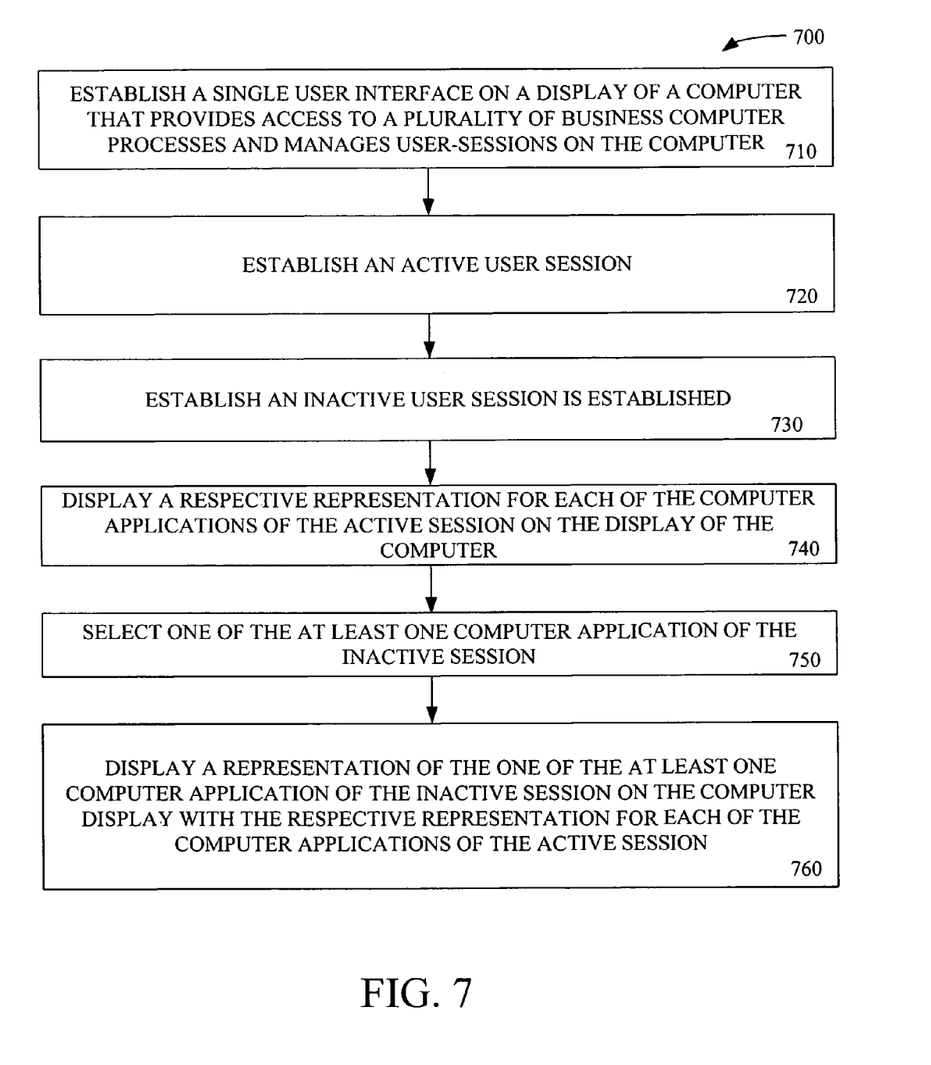

As depicted in FIG. 7, the functionality of another embodiment of the desktop-viewing system 100 or method 700 may be construed as beginning at the step of establishing (710) a single user interface on a display of a computer that provides access to a plurality of business computer processes and manages user-sessions on the computer. Then, an active user session is established (720) by clicking on an "Open Session" button of the single user interface, for example. Further, a user may also launch one or more computer applications that are associated with the active user session. In a similar manner, the user may also establish (730) an inactive user session. The inactive user session also has at least one computer application associated with the inactive user session. A respective representation for each of the computer applications of the active session is displayed (740) on the display of the computer. After selecting (750) a computer application of the inactive session (by clicking on an entry for the computer application from a list in a graphical menu interface, for example), a representation of the computer application of the inactive session on the computer display is displayed (760) with the respective representation for each of the computer applications of the active session. Therefore, if a user is involved in one user-session and an application from another user-session is about to "time out," the user can select to "bring forward" or access the application from the inactive session in order to prevent the application from being automatically terminated. In some embodiments, to reorganize the computer desktop, the user can select a Refresh option on the single user interface which results in only the computer applications of the active session being shown on the computer desktop.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure.

Therefore, having thus described the invention, at least the following is claimed:

1. A system for managing user-sessions comprising:
   a computer processor and memory having instructions comprising:
   logic configured to display a user interface for initiating a command to launch a business application on a computer display of a user;
   logic configured to associate a launched business application with a user-session, wherein business applications associated with the same user-session are pre-populated with information pertaining to a subject of the same user-session and business applications associated with a user-session are hidden from view on the computer display when another user-session is selected to be active;
   logic configured to display all windows attributed to business applications of an active user-session on the computer display;
   a first user interface control for allowing a user to select a particular business application of an inactive user-session, the inactive user-session and the active user-session pertaining to different subjects; and
   logic configured to display on a computer desktop a window of the selected particular business application on the computer display concurrently with all the windows of the business applications associated with the active user-session.

2. The system of claim 1, further comprising:
   a second user interface control enabled to allow the user to refresh the computer display such that only the computer applications associated with the active user-session are displayed.

3. The system of claim 1, wherein the business application is a call-center application.

4. The system of claim 1, wherein the user interface is configured to launch a plurality of business applications for a call-center environment.

5. The system of claim 1, wherein the user interface is an application toolbar interface.

6. The system of claim 5, wherein the first user control alerts the user to a potential timing out of a launched business application.

7. The system of claim 1, wherein all of the business applications of an active user-session are displayed on the computer display and the selected particular business application is displayed with the business applications associated with the active user-session.

8. A method for managing user-sessions, comprising:
   establishing a single user interface on a display of a computer that provides access to a plurality of business computer processes and manages user-sessions on the computer, wherein business applications associated with a same user-session are pre-populated with information pertaining to a subject of the same user-session and business applications associated with a user-session are hidden from view on the computer display when another user-session is selected to be active;

establishing an active user session, the active user session having a plurality of computer applications associated with the active user session;

establishing an inactive user-session, the inactive user-session having at least one computer application associated with the inactive user-session, the inactive user-session and the active user-session pertaining to different subjects;

displaying a respective window representation for a plurality of computer applications of the active user-session on the display of the computer;

selecting one of the at least one computer application of the inactive user-session; and displaying on a computer desktop a window representation of the one of the at least one computer application of the inactive user-session on the computer display concurrently with all the respective window representations for the plurality of computer applications of the active user-session.

9. The method of claim 8, further comprising:

refreshing the computer display so that only computer applications associated with the active user-session are displayed.

10. The method of claim 8, wherein the plurality of business applications perform tasks pertinent to a call-center environment.

11. The method of claim 8, wherein the single user interface is an application toolbar interface.

12. The method of claim 8, further comprising:

alerting the user of a potential timing out of a launched business application.

13. The method of claim 8, wherein all of the business applications of an active user-session are displayed on the computer display and the selected particular business application is displayed with the business applications associated with the active user-session.

14. A computer readable medium having a program for managing user-sessions, wherein the computer readable medium is a physical structure and the computer program is executed by a computer and causes the computer to perform the program comprising:

establishing a single user interface on a display of the computer that provides access to a plurality of business computer processes and manages user-sessions on the computer, wherein business applications associated with a same user-session are pre-populated with information pertaining to a subject of the same user-session and business applications associated with a user-session are hidden from view on the computer display when another user-session is selected to be active;

establishing an active user session, the active user session having a plurality of computer applications associated with the active user-session;

establishing an inactive user-session, the inactive user-session having at least one computer application associated with the inactive user-session, the inactive user-session and the active user-session pertaining to different subjects;

displaying a respective window representation for a plurality of computer applications of the active user-session on the display of the computer;

selecting one of the at least one computer application of the inactive user-session; and displaying on a computer desktop a window representation of the one of the at least one computer application of the inactive user-session on the computer display concurrently with all the respective window representations for the plurality of computer applications of the active user-session.

15. The medium of claim 14, the program further comprising:

refreshing the computer display so that only computer applications associated with the active user-session are displayed.

16. The medium of claim 14, wherein the plurality of business applications perform tasks pertinent to a call-center environment.

17. The medium of claim 14, wherein the single user interface is an application toolbar interface.

18. The medium of claim 14, the program further comprising:

alerting the user of a potential timing out of a launched business application.

19. The medium of claim 14, wherein all of the business applications of an active user-session are displayed on the computer display and the selected particular business application is displayed with the business applications associated with the active user-session.

* * * * *